United States Patent
Luo

(10) Patent No.: US 10,009,943 B2
(45) Date of Patent: Jun. 26, 2018

(54) METHOD FOR CONTROLLING DISCONNECTION DURING CALL, AND TERMINAL

(71) Applicant: ZTE CORPORATION, Shenzhen, Guangdong Province (CN)

(72) Inventor: Yuanni Luo, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days. days.

(21) Appl. No.: 15/506,449

(22) PCT Filed: Oct. 30, 2014

(86) PCT No.: PCT/CN2014/089937
§ 371 (c)(1),
(2) Date: Feb. 24, 2017

(87) PCT Pub. No.: WO2015/117424
PCT Pub. Date: Aug. 13, 2015

(65) Prior Publication Data
US 2017/0273139 A1    Sep. 21, 2017

(30) Foreign Application Priority Data
Aug. 25, 2014 (CN) .......................... 2014 1 0421255

(51) Int. Cl.
*H04W 76/06* (2009.01)

(52) U.S. Cl.
CPC .................. *H04W 76/06* (2013.01)

(58) Field of Classification Search
CPC ...... H04W 76/06; H04W 76/007; H04L 69/40
See application file for complete search history.

(56) References Cited

U.S. PATENT DOCUMENTS

| 9,510,252 B2 * | 11/2016 | Kim ...................... H04W 48/20 |
| 2003/0224757 A1 * | 12/2003 | Dyck ...................... H04L 29/06 |
| | | 455/411 |
| 2008/0194225 A1 * | 8/2008 | Tischer ................... H04L 12/66 |
| | | 455/404.2 |

(Continued)

FOREIGN PATENT DOCUMENTS

| CN | 1870826 | 11/2006 |
| CN | 101119550 | 2/2008 |

(Continued)

OTHER PUBLICATIONS

International Search Report, International application No. PCT/CN2014/089937, dated May 28, 2015.

*Primary Examiner* — Joseph Dean, Jr.
(74) *Attorney, Agent, or Firm* — Koppel, Patrick, Heybl & Philpott

(57) ABSTRACT

A method for controlling disconnection during a call, and a terminal are provided. The method used during the call made between a first terminal and a second terminal includes the following steps that: the first terminal detects a hang-up event generated by a hand-up operation of a local user; the first terminal determines whether or not the second terminal is a controlled terminal included in a preset controlled terminal list; and the first terminal ignores the hang-up event and rejects to send a disconnection message to a network side if the second terminal is a controlled terminal included in the preset controlled terminal list.

20 Claims, 6 Drawing Sheets

(56) References Cited

U.S. PATENT DOCUMENTS

| | | | | |
|---|---|---|---|---|
| 2012/0076121 A1* | 3/2012 | Choi | ................... | H04W 76/062 |
| | | | | 370/338 |
| 2013/0029604 A1* | 1/2013 | Saito | ................... | H04W 76/028 |
| | | | | 455/41.2 |
| 2015/0148012 A1* | 5/2015 | Bhide | ................... | H04W 76/06 |
| | | | | 455/414.1 |

FOREIGN PATENT DOCUMENTS

| | | |
|---|---|---|
| CN | 101426277 | 5/2009 |
| CN | 101610544 | 12/2009 |
| EP | 2642734 | 9/2013 |

\* cited by examiner

METHOD FOR CONTROLLING DISCONNECTION DURING CALL, AND TERMINAL

TECHNICAL FIELD

The present disclosure relates to the field of communication technologies, and in particular to a method for controlling disconnection during a call, and a terminal.

BACKGROUND

In relevant arts, during a call involving at least one mobile phone, both of the caller party and the called party can initiatively conduct a disconnection operation (hang up) to end the call. The owner of a mobile phone who is in danger may be viciously and forcibly cut off after a call is connected, or the owner of a mobile phone may hang up wrongly at a crisis moment after the call is connected, which will lead to the disconnection of the call and therefore make it impossible to provide information for rescuers and consequentially delay precious rescue time. Moreover, as more and more elderly people start to use mobile phones, the use of mobile phones by the elderly people is always hindered by the problem that a call is hung up by the wrong press of a button by an elderly person.

SUMMARY

A method for controlling disconnection during a call, and a terminal are provided in embodiments of the present disclosure to at least realize an effect that during a call, only a service controlling party can control disconnection to end the call and a controlled party cannot conduct disconnection initiatively.

To this end, a method for controlling disconnection during a call is provided in an embodiment of the present disclosure. The method used during the call made between a first terminal and a second terminal includes the following steps that:

the first terminal detects a hang-up event generated by a hand-up operation of a local user;

the first terminal determines whether or not the second terminal is a controlled terminal included in a preset controlled terminal list; and the first terminal ignores the hang-up event and rejects to send a disconnection message to a network side if the second terminal is a controlled terminal included in the preset controlled terminal list.

The method further includes the following step that:

the first terminal sends the disconnection message to the network side in response to the hang-up event if the second terminal is not a controlled terminal included in the preset controlled terminal list.

The controlled terminal list is set in a manner which includes the following step that:

the first terminal sets the controlled terminal list according to controlled terminal information input by a user or distributed by the network side.

The step that the first terminal ignores the hang-up event and rejects to send the disconnection message to the network side if the second terminal is a controlled terminal included in the preset controlled terminal list includes the following step that:

the first terminal sets a preset control flag if the second terminal is a controlled terminal included in the preset controlled terminal list, and the first terminal ignores the hang-up event and rejects to send the disconnection message to the network side in a case of detecting the preset control flag.

After the first terminal ignores the hang-up event and rejects to send the disconnection message to the network side if the second terminal is a controlled terminal included in the preset controlled terminal list, the method further includes the following step that:

upon receiving a disconnection message of the call sent from the network side, the first terminal releases the call in response to the disconnection message, wherein the disconnection message of the call is sent by the network side based on a hang-up event of the second terminal.

The step that upon receiving the disconnection message of the call sent from the network side, the first terminal releases the call in response to the disconnection message includes the following steps that:

the first terminal detects whether or not a preset control flag is set on the first terminal when receiving the disconnection message of the call sent from the network side; and if the preset control flag is set on the first terminal, the preset control flag is cleared and the call is released in response to the disconnection message, otherwise, the call is released directly in response to the disconnection message.

The method further includes the following step that:

the first terminal sets to automatically answer a call initiated by the controlled terminal.

A terminal is also provided in an embodiment of the present disclosure, including:

a detection module arranged to detect a hang-up event generated by a hand-up operation of a local user;

a determination module arranged to determine whether or not a second terminal is a controlled terminal included in a preset controlled terminal list; and a first execution module arranged to ignore the hang-up event and reject to send a disconnection message to a network side if the second terminal is a controlled terminal included in the preset controlled terminal list.

The terminal further includes:

a second execution module arranged to send the disconnection message to the network side in response to the hang-up event if the second terminal is not a controlled terminal included in the preset controlled terminal list.

The terminal further includes:

a first setting module arranged to set the controlled terminal list according to controlled terminal information input by a user or distributed by the network side.

The first execution module includes:

a first execution sub-module arranged to set a preset control flag if the second terminal is a controlled terminal included in the preset controlled terminal list and ignore the hang-up event and reject to send the disconnection message to the network side in a case of detecting the preset control flag.

The terminal further includes:

a third execution module arranged to, upon receiving a disconnection message of the call sent from the network side, release the call in response to the disconnection message, wherein the disconnection message of the call is sent by the network side based on a hang-up event of the second terminal.

The third execution module includes:

a third execution sub-module arranged to detect whether or not a preset control flag is set on a first terminal when receiving the disconnection message of the call sent from the network side; and a fourth execution sub-module arranged to clear the preset control flag and release the call in response to the disconnection message if the preset control flag is set on the first terminal or directly release the call in response to the disconnection message if the preset control flag is not set on the first terminal.

The terminal further includes:

a second setting module arranged to set to automatically answer a call initiated by the controlled terminal.

The foregoing technical solutions of the embodiments of the present disclosure at least have the following beneficial effects:

by presetting controlled terminals and causing, during the call between a first terminal and a second terminal, the first terminal to ignore a local hand-up event thereof and reject to send the disconnection message to the network side if the second terminal is a controlled terminal included in the preset controlled terminal list, and conduct disconnection successfully to end the call only if the second terminal sends a disconnection message to the network side, the method for controlling disconnection during a call provided herein realizes an effect that that during a call, only a service controlling party can control disconnection to end the call and a controlled party cannot conduct a disconnection initiatively.

DETAILED DESCRIPTION OF THE EMBODIMENTS

To make technical problems to be addressed by the present disclosure, the technical solutions of the present disclosure the advantages of the present disclosure understood better, the present disclosure is described below in detail with reference to accompanying drawings when read in conjunction with embodiments of the present disclosure.

In relevant arts, there exists a problem that because both the caller party and the called party can optionally hang up a phone to complete a disconnection, rescue time may be delayed because a call may be hung up by a wrong operation made in a crisis situation, or a call may be disconnected because the elderly people may hang up a phone after pressing a button wrongly. To address the problem, a method for controlling disconnection during a call, and a terminal are provided herein which realize an effect that that during a call, only a service controlling party can control disconnection to end the call and a controlled party cannot conduct a disconnection initiatively. Such effect is achieved by presetting controlled terminals and causing, during the call between a first terminal and a second terminal, the first terminal to ignore a local hand-up event thereof and reject to send the disconnection message to the network side if the second terminal is a controlled terminal included in the preset controlled terminal list, and conduct disconnection successfully to end the call only if the second terminal sends a disconnection message to the network side.

Figure 1:
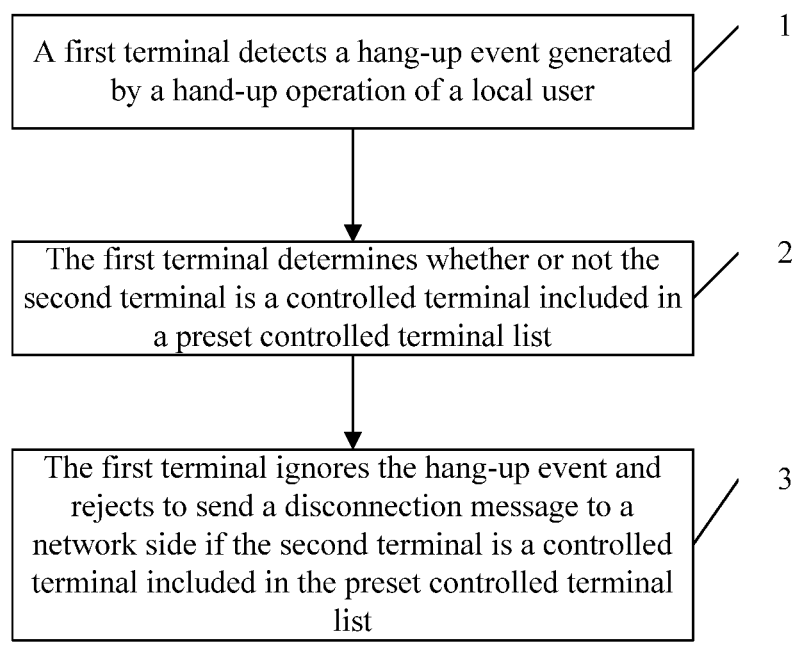
FIG. 1 is a flowchart illustrating basic steps of a method for controlling disconnection during a call according to an embodiment of the present disclosure.

As shown in FIG. 1, a method for controlling disconnection during a call provided herein which is used during the call made between a first terminal and a second terminal includes the following steps that:

Step 1: the first terminal detects a hang-up event generated by a hand-up operation of a local user;

Step 2: the first terminal determines whether or not the second terminal is a controlled terminal included in a preset controlled terminal list; and Step 3: the first terminal ignores the hang-up event and rejects to send a disconnection message to a network side if the second terminal is a controlled terminal included in the preset controlled terminal list.

In the foregoing embodiment of the present disclosure, the controlled terminal list may include a caller control list and a called control list. In a case where the first terminal is a calling terminal, the preset controlled terminal list is referred to as a called control list. In a case where the first terminal is a called terminal, the preset controlled terminal list is referred to as a caller control list.

Figure 2:
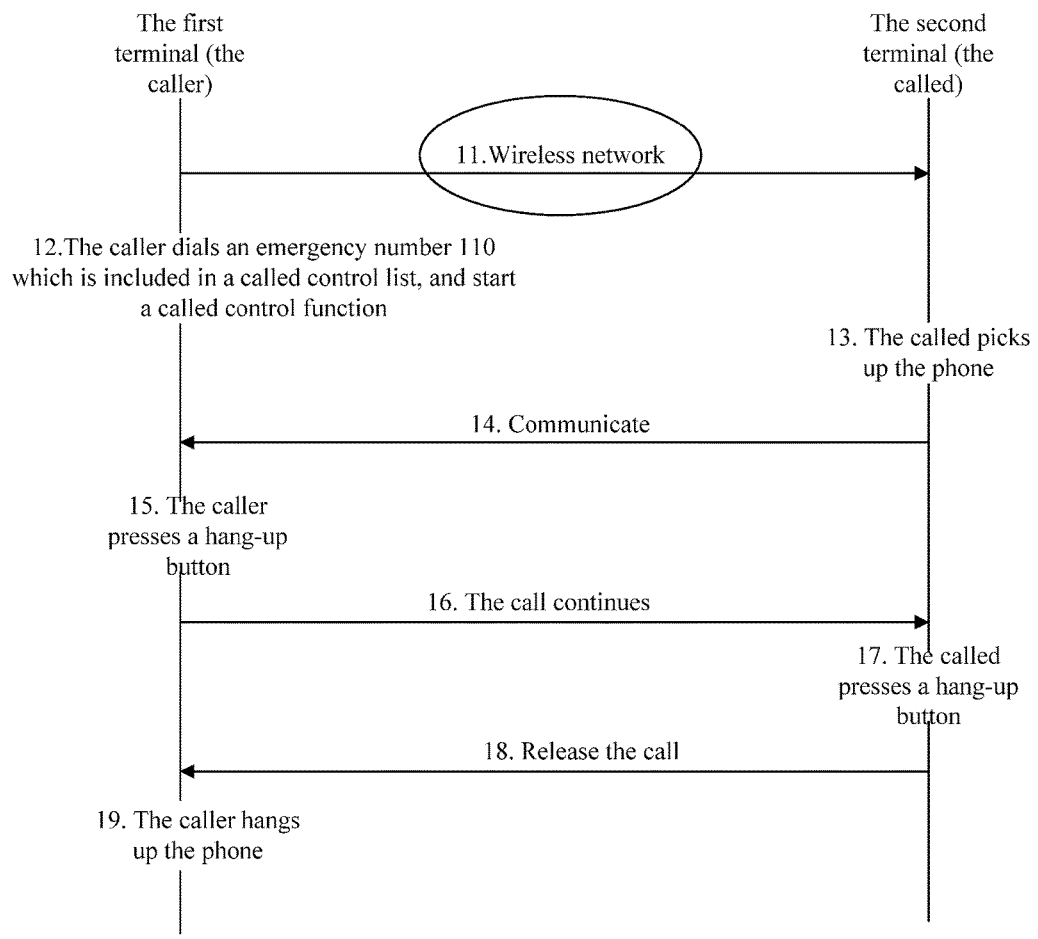
FIG. 2 is a flowchart illustrating a call and disconnection process in a case where a first terminal is a calling terminal according to an embodiment of the present disclosure.

As shown in FIG. 2, if the first terminal is a calling terminal, then the second terminal is a called terminal. Assuming that the number of the second terminal is 110 (an emergency number), the basic steps of the embodiment of the present disclosure may include:

Step 11: the caller picks up the phone (the first terminal is taken off the hook);

Step 12: the caller dials an emergency number 110 which is included in a called control list, and a called control function is activated;

Step 13: the called picks up the phone (the second terminal is taken off the hook);

Step 14: the first terminal and the second terminal enter a communication state;

Step 15: the caller presses a hang-up button (a hang-up operation), the calling terminal ignores the hang-up operation, that is, the hang-up button is invalid;

Step 16: the call continues;

Step 17: the called presses a hang-up button (the hang-up button of the second terminal is pressed), and a disconnection message is sent to a network side to release the call;

Step 18: the caller receives a call release signal sent from the network side; and Step 19: the caller hangs up the phone to end the call.

Figure 3:
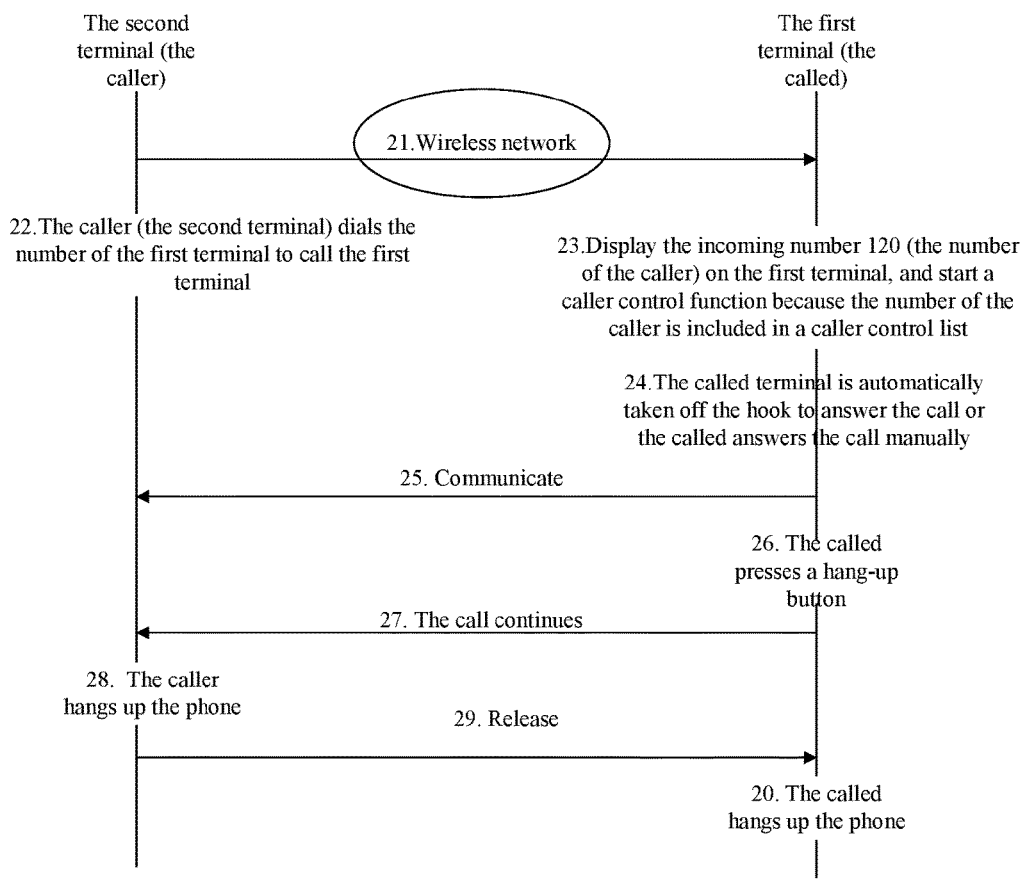
FIG. 3 is a flowchart illustrating a call and disconnection process in a case where a first terminal is a called terminal according to an embodiment of the present disclosure.

As shown in FIG. 3, if the first terminal is a called terminal, then the second terminal is a calling terminal. Assuming that the number of the second terminal is 120 (an emergency number), the basic steps of the embodiment of the present disclosure include:

Step 21: the caller picks up the phone (the second terminal is taken off the hook);

Step 22: the caller (the second terminal) dials the number of the first terminal to call the first terminal;

Step 23: the incoming number 120 (the number of the caller) is displayed on the first terminal, because the number of the caller is included in a caller control list, a caller control function is activated;

Step 24: the called terminal is automatically taken off the hook to answer the call or the called answers the call manually;

Step 25: the second terminal and the first terminal enter a communication state;

Step 26: the called presses a hang-up button (the hang-up button of the first terminal is pressed), the called terminal ignores the hang-up operation, that is, the hang-up button is invalid;

Step 27: the call continues;

Step 28: the caller hangs up the phone (the second terminal is hang-up), and a disconnection message is sent to a network side, and the call is released;

Step 29: the called (the first terminal) receives a call release signal sent from the network side; and Step 30: the called hangs up the phone to end the call.

In a specific embodiment of the present disclosure, the method further includes the following step:

Step 4: the first terminal send a disconnection message to the network side in response to the hang-up event if the second terminal is not a controlled terminal included in the preset controlled terminal list.

It should be noted that if the second terminal is not a controlled terminal included in the preset controlled terminal list, then the first terminal communicates with the second terminal normally. When either of the two communication parties hangs up the phone, the terminal sends a disconnection request to the network side in response to the hang-up operation to release the call. When receiving the disconnection message of the call sent from the network side, the other party making no hang-up operation responds to the disconnection message to hang up the phone to end the call.

In the foregoing embodiment, after the first terminal ignores the hang-up event and rejects to send the disconnection message to the network side because the second terminal is a controlled terminal, the method may further include the following step that: upon receiving a disconnection message of the call sent from the network side, the first terminal releases the call in response to the disconnection message, wherein the disconnection message of the call is sent by the network side based on a hang-up event of the second terminal.

In the foregoing embodiment, the controlled terminal list is set in a manner which includes the following step that:

Step 6: the first terminal sets the controlled terminal list according to controlled terminal information input by a user or distributed by the network side.

In a specific embodiment of the present disclosure, the controlled terminal list is authenticated using the following two methods. The first method is a terminal setting method according to which a user sets each controlled number on a terminal, the terminal determines whether or not an incoming number is one of the numbers included in a controlled terminal list, if so, a control rule takes effect, otherwise, the call proceeds normally. The second method is a method according to which each controlled number is set in a core network and pushed to a terminal through an intelligent push service, a control rule takes effect when a terminal receives a controlled number, or the terminal makes a call normally if the terminal receives non-controlled number.

It should be noted that in the use of the terminal setting method, the configuration items which need to be provided on a terminal include a caller control list and a called control list. The specific content included in the caller control list and/or the called control list may be numbers of terminals. For example, if the caller control list configured in the mobile phone of an elderly person includes the phone number of his/her son/daughter, then a call made to the elderly person by the son/daughter of the elderly person included in the list can only be ended by this son/daughter during the process of the call, thus preventing the elderly person from hanging up his/her phone by wrongly pressing a key. In this way, the terminal setting method brings much convenience for the elderly person in using a mobile phone. Alternatively, a user can store some emergency numbers such as 110 and 119 in the called control list of a terminal so that only the user of the terminal whose number is an emergency number included in the list can hang up the phone to send the disconnection message to the network side to release a call after the user dials the emergency number. In this way, the occurrence of a situation that rescue time is delayed because a call made by a user for help in emergency is forcibly ended is avoided, thereby bringing convenience for people in emergency.

In the foregoing embodiment, Step 3 includes:

Step 31: the first terminal sets a preset control flag if the second terminal is a controlled terminal included in the preset controlled terminal list, and the first terminal ignores the hang-up event and rejects to send the disconnection message to the network side in a case of detecting the preset control flag.

In a specific embodiment of the present disclosure, the preset control flag mainly includes a caller control flag and a called control flag. In order to enable the user of the first terminal to clearly and plainly determine whether or not the current call is in a controlled communication state or an ordinary communication state, a caller control flag corresponding to the caller control function and a called control flag corresponding to the called control function are separately set on the first terminal. If the caller control flag is detected by the first terminal, then the current call is in a caller control state. If the called control flag is detected by the first terminal, then the current call is in a called control state. If no preset control flag is detected by the first terminal, then the current call is in an ordinary state, that is, any of two communication parties can conduct a disconnection operation to release the call.

Step 5: upon receiving a disconnection message of the call sent from the network side, the first terminal releases the call in response to the disconnection message, wherein the disconnection message of the call is sent by the network side based on a hang-up event of the second terminal.

In a specific embodiment of the present disclosure, if the second terminal is a controlled terminal included in the preset controlled terminal list, the first terminal makes no response to the hang-up event thereof, that is, the hang-up button of the first terminal is invalid. As a result, only when the second terminal is hang-up and sends the disconnection message, the network side conducts disconnection for the current call in response to the disconnection message sent from the second terminal to the network side; at the same time, the network side sends a disconnection message of the current call to the first terminal, and the first terminal releases the call in response to the message, that is, the first terminal is hang-up to end the call.

Based on the foregoing example, in a specific embodiment of the present disclosure, Step 5 includes:

Step 51: the first terminal detects whether or not a preset control flag is set on the first terminal when receiving the disconnection message of the call sent from the network side; and Step 52: if the preset control flag is set on the first terminal, the preset control flag is cleared and the call is released in response to the disconnection message, otherwise, the call is released directly in response to the disconnection message.

In the foregoing embodiment, because a corresponding control flag is set by the first terminal in Step 31, when the first terminal receives a disconnection message of the call sent from the network side (that is, the hang-up of the second terminal), the first terminal needs to clear the control flag first and then hang up to end the call in response to the disconnection message sent from the network side.

In the foregoing embodiment of the present disclosure, the method further includes the following step:

Step 7: the first terminal sets to automatically answer a call initiated by the controlled terminal.

In specific embodiments of the present disclosure, if the first terminal is a called terminal, then the first terminal sets the state thereof to be automatic offhook answering state aiming at a call initiatively made by a controlled terminal. For example, in a case where an elderly person sets his/her son/daughter phone number as a controlled terminal, when the son/daughter of the elderly person calls the elderly person, the call is answered automatically by the mobile phone of the elderly person after a preset ringing sounds, not needing the elderly person to press an answer key. In this way, the occurrence of a situation that the elderly person already misses a call from his/her son/daughter when the elderly person walks to his/her mobile phone that is not nearby is avoided, thus bringing more convenience for the elderly person in using a mobile phone.

The whole flow of the method separately processed in a case where the first terminal is a calling terminal and in a case where the first terminal is a called terminal is separately described below with reference to separate specific embodiments.

Figure 4:
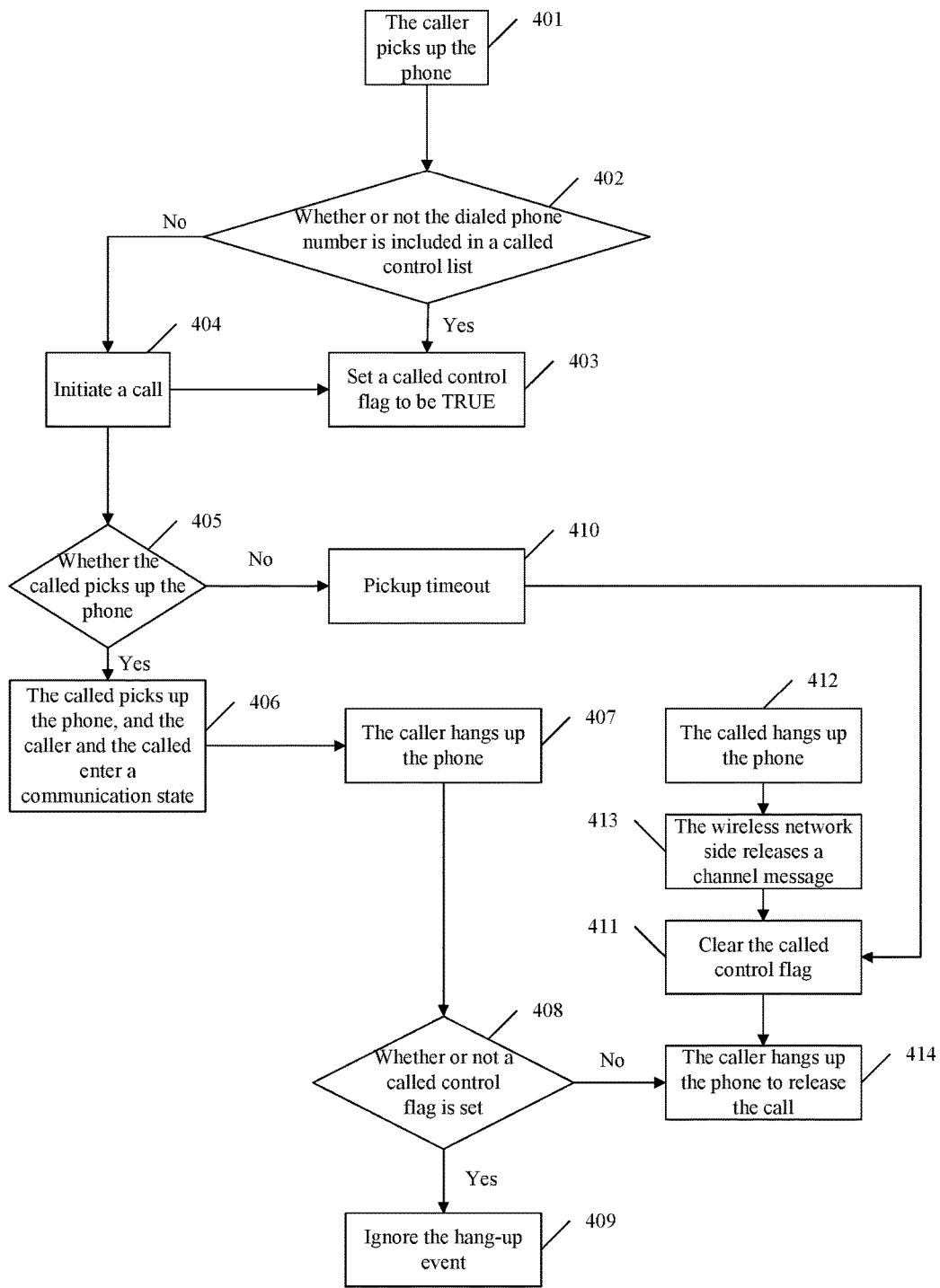
FIG. 4 is a flowchart illustrating a specific embodiment 1 of the present disclosure.

Specific embodiment 1: a called control function (the first terminal is a calling terminal), as shown in FIG. 4.

Step 401: the caller picks up the phone (the first terminal is taken off the hook) to be ready for dialing;

Step 402: whether or not the dialed phone number is included in a called control list is determined, if so, the flow proceeds to Step 403, otherwise, the flow proceeds to Step 404;

Step 403: a called control flag is set to be TRUE, and the flow proceeds to Step 404;

Step 404: a normal call is initiated, and the flow proceeds to Step 405;

Step 405: the caller and the called enter a communication state if the called picks up the phone, and then the flow proceeds to Step 406, or the flow proceeds to Step 410 if the caller fails to answer;

Step 406: the called picks up the phone, then the caller and the called enter a communication state, the flow proceeds to Step 407;

Step 407: the caller hangs up the phone, and the flow proceeds to Step 408;

Step 408: whether or not a called control flag is set is determined, if the flag is TRUE, the flow proceeds to Step 409; otherwise, the flow proceeds to Step 414;

Step 409: the hang-up event is ignored, and no processing is implemented;

Step 410: the called fails to pick up the phone, and the flow proceeds to Step 411;

Step 411: the called control flag is cleared, and the flow proceeds to Step 414;

Step 412: the called hangs up the phone, and the flow proceeds to Step 413;

Step 413: the caller receives a call release message from the network side, and the flow proceeds to Step 411; and Step 414: the caller hangs up the phone, and the call is ended.

Figure 5:
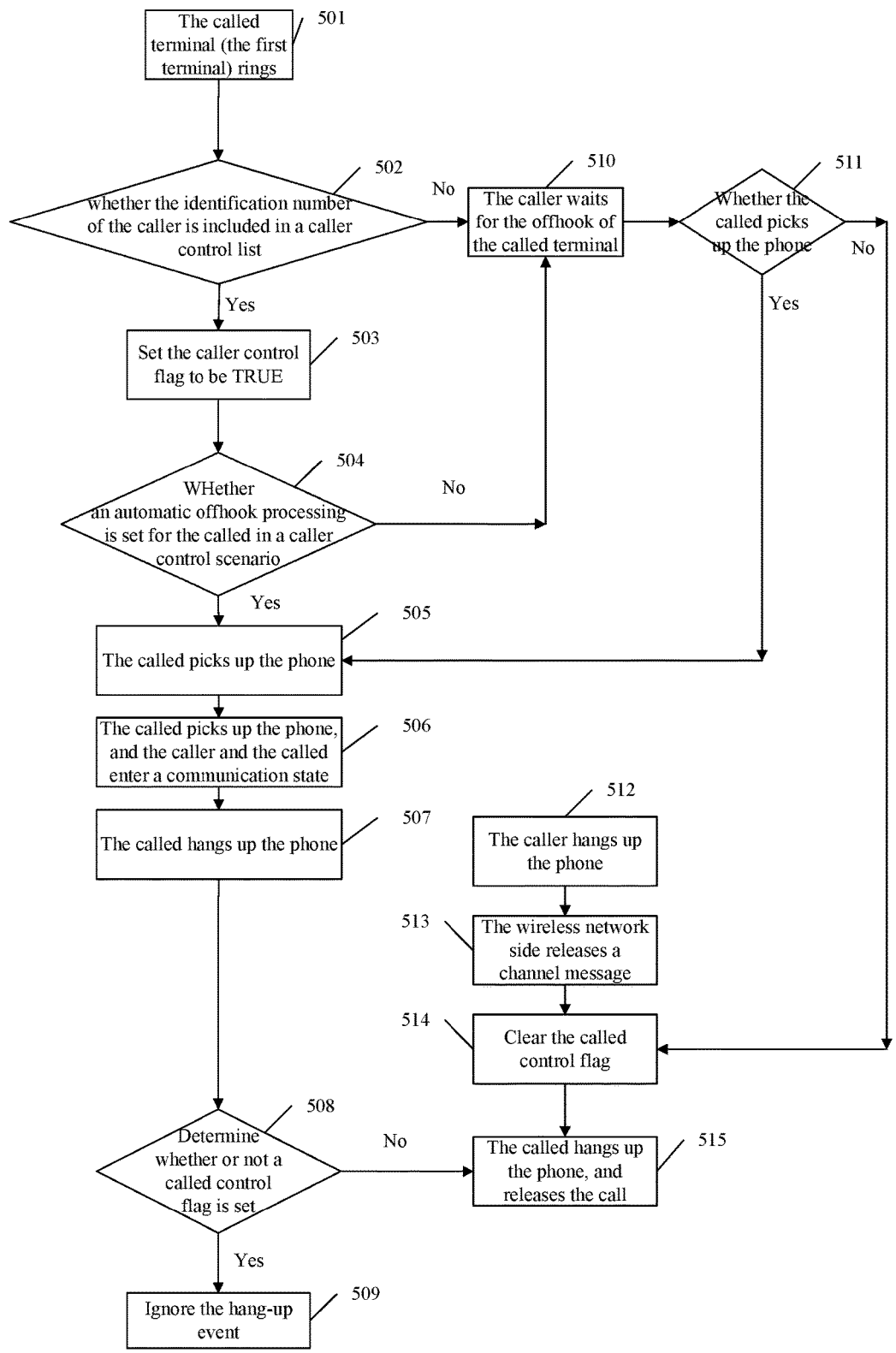
FIG. 5 is a flowchart illustrating a specific embodiment 2 of the present disclosure.

Specific embodiment 2: a caller control function (the first terminal is a called terminal), as shown in FIG. 5.

Step 501: the called terminal (the first terminal) rings;

Step 502: it is determined whether or not the identification number of the caller is included in a caller control list, if so, the flow proceeds to Step 503, otherwise, the flow proceeds to Step 510;

Step 503: the caller control flag is set to be TRUE, and then the flow proceeds to Step 504;

Step 504: it is determined whether or not the selection of an automatic off hook processing in a caller control scenario is set in configuration, if so, the flow proceeds to Step 505, otherwise, the flow proceeds to Step 510;

Step 505: the called picks up the phone to answer the caller, and the flow proceeds to Step 506;

Step 506: the caller and the called enter a communication state, and the flow proceeds to Step 507;

Step 507: the called hangs up the phone, and the flow proceeds to Step 508;

Step 508: it is determined whether or not a caller control flag is set, if the flag is TRUE, the flow proceeds to Step 509; otherwise, the flow proceeds to Step 515;

Step 509: the hang-up event is ignored, and no processing is implemented;

Step 510: the caller waits for the offhook of the called terminal, and the flow proceeds to Step 511;

Step 511: if the called terminal is offhook, the flow proceeds to Step 505, otherwise, the flow proceeds to Step 514;

Step 512: the caller hangs up the phone, and the flow proceeds to Step 513;

Step 513: the called receives a call release message sent from a network side, and the flow proceeds to Step 514;

Step 514: the caller control flag is cleared, the flow proceeds to Step 515; and Step 515: the caller hangs up the phone, and the call is ended.

Figure 6:
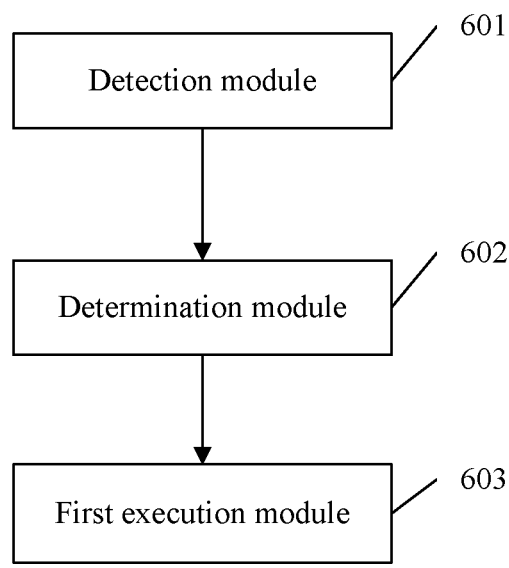
FIG. 6 is a schematic diagram illustrating the structure of a terminal according to an embodiment of the present disclosure.

To realize the foregoing purpose better, a terminal is also provided in an embodiment of the present disclosure, and as shown in FIG. 6, the terminal includes:

a detection module 600 arranged to detect a hang-up event generated by a hand-up operation of a local user;

a determination module 601 arranged to determine whether or not the second terminal is a controlled terminal included in a preset controlled terminal list; and a first execution module 602 arranged to ignore the hang-up event and reject to send a disconnection message to a network side if the second terminal is a controlled terminal included in the preset controlled terminal list.

In the foregoing embodiment of the present disclosure, the terminal further includes:

a second execution module arranged to send the disconnection message to the network side in response to the hang-up event if the second terminal is not a controlled terminal included in the preset controlled terminal list.

In the foregoing embodiment of the present disclosure, the terminal further includes:

a first setting module arranged to set the controlled terminal list according to controlled terminal information input by a user or distributed by the network side.

In the foregoing embodiment of the present disclosure, the first execution module 602 includes:

a first execution sub-module arranged to set a preset control flag if the second terminal is a controlled terminal included in the preset controlled terminal list, ignore the hang-up event and reject to send the disconnection message to the network side in a case of detecting the preset control flag.

In the foregoing embodiment of the present disclosure, the terminal further includes:

a third execution module arranged to, upon receiving a disconnection message of the call sent from the network side, release the call in response to the disconnection message, wherein the disconnection message of the call is sent by the network side based on a hang-up event of the second terminal.

In the foregoing embodiment of the present disclosure, the third execution module includes:

a third execution sub-module arranged to detect whether or not a preset control flag is set on a first terminal when receiving the disconnection message of the call sent from the network side; and a fourth execution sub-module arranged to clear the preset control flag and release the call in response to the disconnection message if the preset control flag is set on the first terminal or directly release the call in response to the disconnection message if the preset control flag is not set on the first terminal.

In the foregoing embodiment of the present disclosure, the terminal further includes:

a second setting module arranged to set a state of the terminal to be an automatic offhook answering state for a call initiated by the controlled terminal.

Capable of being realized by adding a caller/called control module to an existing terminal, the terminal disclosed herein has the following main functions: 1) determine whether or not the terminal has a caller/called control function; 2) set a caller control function and/or a called control function; 3) in the use of the called control function, a dialing module determines whether or not the call is in a called control list, if so, the current call is recorded to be a call with activated called control flag, otherwise, the function is invalid; 4) after a conversation is started, determine whether or not the current call is recorded to be a call with activated called control flag, if so, then the press of the user on a hang-up button is not processed; 5) clear the flag and end the call after receiving a call release message sent from a network side; 6) when the caller control function is activated, the ringing module of the called terminal identifies the calling number of the current call, if the calling number is in the caller control list, then the current call is recorded to be a call with activated caller control flag, otherwise, the function is not activated; 7) after a conversion is started, determine whether or not the current call is recorded to be a call with activated caller control flag, if so, then the hang-up event resulting from the press of the user on a hang-up button is not processed; and 8) the flag is cleared and the call is ended after a call release message sent from the network side is received.

By presetting controlled terminals and causing, during the call made between a first terminal and a second terminal, the first terminal to ignore a local hand-up event thereof and reject to send the disconnection message to the network side if the second terminal is a controlled terminal included in the preset controlled terminal list or conduct disconnection successfully to end the call only if the second terminal sends a disconnection message to the network side, the method for controlling disconnection during a call provided herein realizes an effect that that during a call, only a service controlling party can control disconnection to end the call and a controlled party cannot conduct a disconnection initiatively.

It should be noted that the terminal provided herein is a terminal capable of realizing the foregoing method for controlling disconnection during a call and all embodiments of the foregoing method are applicable to the terminal and are capable of achieving the same or similar beneficial effects in the terminal.

Although preferred embodiments of the present are described above, it should be noted that a variety of improvements and modifications can be devised by those of ordinary skill in the art without departing from the principle of the present disclosure and that such improvements and modifications should fall within the scope of the protection defined by the appended claims of the present disclosure.

INDUSTRIAL APPLICABILITY

In conclusion, the method for controlling disconnection during a call and the terminal provided herein have the following beneficial effects. By presetting controlled terminals and causing, during the call between a first terminal and a second terminal, the first terminal to ignore a local hand-up event thereof and reject to send the disconnection message to the network side if the second terminal is a controlled terminal included in the preset controlled terminal list, and conduct disconnection successfully to end the call only if the second terminal sends a disconnection message to the network side, the method and the terminal realize an effect that that during a call, only a service controlling party can control disconnection to end the call and a controlled party cannot conduct a disconnection initiatively.

What is claimed is:

1. A method for controlling disconnection during a call made between a first terminal and a second terminal, comprising:

detecting, by the first terminal, a hang-up event generated by a hang-up operation of a local user;

determining, by the first terminal, whether or not the second terminal is a controlled terminal included in a preset controlled terminal list; and ignoring the hang-up event and rejecting to send a disconnection message to a network side by the first terminal if the second terminal is a controlled terminal included in the preset controlled terminal list.

2. The method as claimed in claim 1, further comprising:

sending, by the first terminal, the disconnection message to the network side in response to the hang-up event if the second terminal is not a controlled terminal included in the preset controlled terminal list.

3. The method as claimed in claim 1, wherein the controlled terminal list is set in a manner which comprises:

setting, by the first terminal, the controlled terminal list according to controlled terminal information input by a user or distributed by the network side.

4. The method as claimed in claim 1, wherein ignoring the hang-up event and rejecting to send the disconnection message to the network side by the first terminal if the second terminal is a controlled terminal included in the preset controlled terminal list comprises:

setting, by the first terminal, a preset control flag if the second terminal is a controlled terminal included in the preset controlled terminal list, and ignoring the hang-up event and rejecting to send the disconnection message to the network side by the first terminal in a case that the first terminal detects the preset control flag.

5. The method as claimed in claim 1, wherein after ignoring the hang-up event and rejecting to send the disconnection message to the network side by the first terminal if the second terminal is a controlled terminal included in the preset controlled terminal list, the method further comprises:

upon receiving a disconnection message of the call sent from the network side, releasing, by the first terminal, the call in response to the disconnection message, wherein the disconnection message of the call is sent by the network side based on a hang-up event of the second terminal.

6. The method as claimed in claim 5, wherein upon receiving the disconnection message of the call sent from the network side, releasing, by the first terminal, the call in response to the disconnection message comprises:
  detecting, by the first terminal, whether or not a preset control flag is set on the first terminal when the first terminal receives the disconnection message of the call sent from the network side; and
    if the preset control flag is set on the first terminal, clearing the preset control flag and releasing the call in response to the disconnection message, otherwise, directly releasing the call in response to the disconnection message.

7. The method as claimed in claim 1, further comprising: setting, by the first terminal, to automatically answer a call initiated by the controlled terminal.

8. A terminal, comprising:
  a detection module arranged to detect a hang-up event generated by a hang-up operation of a local user;
  a determination module arranged to determine whether or not a second terminal is a controlled terminal included in a preset controlled terminal list; and
  a first execution module arranged to ignore the hang-up event and reject to send a disconnection message to a network side if the second terminal is a controlled terminal included in the preset controlled terminal list.

9. The terminal as claimed in claim 8, further comprising:
  a second execution module arranged to send the disconnection message to the network side in response to the hang-up event if the second terminal is not a controlled terminal included in the preset controlled terminal list.

10. The terminal as claimed in claim 8, further comprising:
  a first setting module arranged to set the controlled terminal list according to controlled terminal information input by a user or distributed by the network side.

11. The terminal as claimed in claim 8, wherein the first execution module comprises:
  a first execution sub-module arranged to set a preset control flag if the second terminal is a controlled terminal included in the preset controlled terminal list and ignore the hang-up event and reject to send the disconnection message to the network side in a case of detecting the preset control flag.

12. The terminal as claimed in claim 8, further comprising:
  a third execution module arranged to, upon receiving a disconnection message of the call sent from the network side, release the call in response to the disconnection message, wherein the disconnection message of the call is sent by the network side based on a hang-up event of the second terminal.

13. The terminal as claimed in claim 12, wherein the third execution module comprises:
  a third execution sub-module arranged to detect whether or not a preset control flag is set on a first terminal when receiving the disconnection message of the call sent from the network side; and
  a fourth execution sub-module arranged to clear the preset control flag and release the call in response to the disconnection message if the preset control flag is set on the first terminal or directly release the call in response to the disconnection message if the preset control flag is not set on the first terminal.

14. The terminal as claimed in claim 8, further comprising:
  a second setting module arranged to set to automatically answer a call initiated by the controlled terminal.

15. The method as claimed in claim 1, wherein the preset controlled terminal list comprises a caller control list and a called control list, wherein in a case where the first terminal is a calling terminal, the preset controlled terminal list is referred to as the called control list, and in a case where the first terminal is a called terminal, the preset controlled terminal list is referred to as the caller control list.

16. The method as claimed in claim 7, wherein the preset controlled terminal list comprises a caller control, list and a called control list, wherein in a case where the first terminal is a calling terminal, the preset controlled terminal list is referred to as the called control list, and in a case where the first terminal is a called terminal, the preset controlled terminal list is referred to as the caller control list.

17. The method as claimed in claim 1, wherein the preset controlled terminal list is authenticated using at least one of the following two methods:
  a first method is a terminal setting method according to which a user sets each controlled number on a terminal, the terminal determines whether or not an incoming number is one of numbers included in the preset controlled terminal list, if so, a control rule takes effect, otherwise, the call proceeds normally;
  a second method is a method according to which each controlled number is set in a core network and pushed to a terminal through an intelligent push service, a control rule takes effect when a terminal receives a controlled number, or the terminal makes a call normally if the terminal receives non-controlled number.

18. The method as claimed in claim 7, wherein the preset controlled terminal list is authenticated using at least one of the following two methods:
  a first method is a terminal setting method according to which a user sets each controlled number on a terminal, the terminal determines whether or not an incoming number is one of numbers included in the preset controlled terminal list, if so, a control rule takes effect, otherwise, the call proceeds normally;
  a second method is a method according to which each controlled number is set in a core network and pushed to a terminal through an intelligent push service, a control rule takes effect when a terminal receives a controlled number, or the terminal makes a call normally if the terminal receives non-controlled number.

19. The method as claimed in claim 4, wherein the preset control flag comprises a caller control flag and a called control flag, wherein if the caller control flag is detected by the first terminal, then the current call is in a caller control state; and if the called control flag is detected by the first terminal, then the current call is in a called control state.

20. The method as claimed in claim 6, wherein the preset control flag comprises a caller control flag and a called control flag, wherein if the caller control flag is detected by the first terminal, then the current call is in a caller control state; and if the called control flag is detected by the first terminal, then the current call is in a called control state.

* * * * *